Patented Oct. 20, 1942

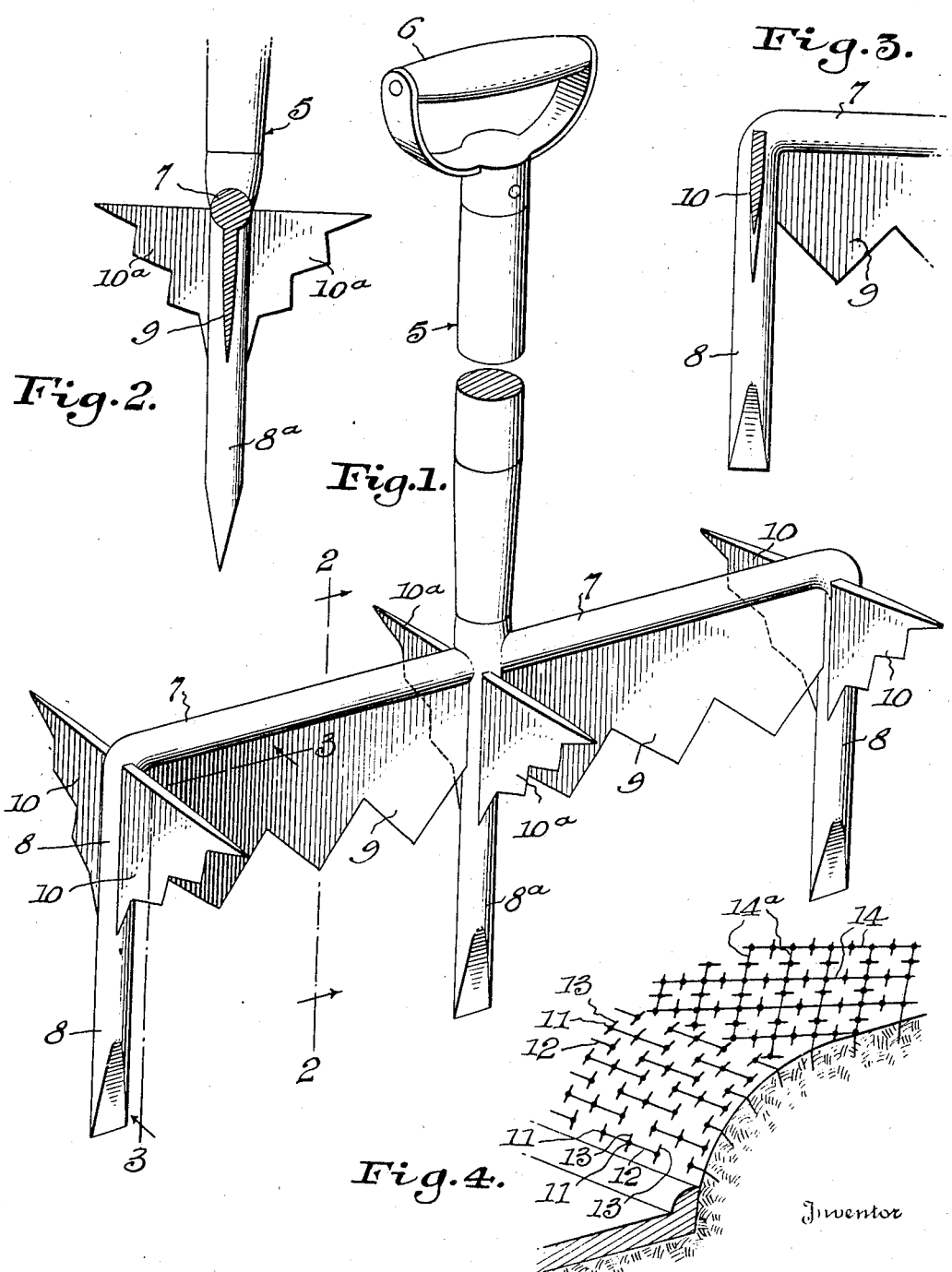

2,299,378

UNITED STATES PATENT OFFICE 2,299,378

LAWN INCISION METHOD

John D. Cain, Denver, Colo.

Application August 9, 1940, Serial No. 352,029

4 Claims. (Cl. 47—58)

The invention aims to provide a novel and advantageous method for preparing lawns and the like for water reception, whether the preparatory steps be performed with the tool herein disclosed, or in some other manner.

With the foregoing and minor objects in view, the invention resides in the novel subject matter hereinafter described and claimed, description being accomplished by reference to the accompanying drawing.

Figure 1 is a perspective view of a tool suitable for carrying out the method, with a portion of the handle broken away.

Figures 2 and 3 are detail vertical sectional views on lines 2—2 and 3—3 of Fig. 1.

Figure 4 is a perspective diagram illustrating the ways in which a horizontal portion of a lawn and a terrace may be prepared for water reception with the aid of the tool shown in the preceding views.

A preferred tool has been illustrated and will be rather specifically described, with the understanding, however, that the method is not limited to performance by said tool.

The numeral 5 denotes a vertical handle similar to an ordinary shovel handle or that of a spade, spading fork or the like, said handle having an appropriate hand grip 6. Suitably secured to the lower end of the handle 5 and projecting laterally in opposite directions therefrom, is a horizontally elongated metal bar 7, the ends of said bar being provided with vertical downwardly projecting pointed prongs 8 to penetrate the earth. The center of the bar 7 is also provided with a third downwardly projecting prong 8a which is preferably welded or otherwise integrally joined thereto. The prongs 8 and 8a may well be eight or nine inches in length to penetrate through the top soil and somewhat into the subsoil, and I prefer that the bar 7 be about twelve inches long.

Two earth-slitting blades 9 are disposed in vertical planes under the bar 7 and said blades extend horizontally between the central prong 8a and the other prongs 8, being welded or otherwise rigidly secured to said bar and prongs. The lower edges of the blades 9 are sharpened to readily penetrate the earth, and said edges are preferably of zig-zag or toothed form, as shown. Somewhat shorter lateral blades 10, in vertical planes at right angles to the blades 9, are welded or otherwise rigidly secured to the prongs 8, and similar blades 10a are secured in the same way to the central prong 8a. All of the blades 9, 10 and 10a are preferably of about four inches in height, said blades 10 and 10a are by preference more or less triangular, and the lower sharpened edges of these blades are preferably of zig-zag or toothed form as shown.

When the tool is forced into a lawn with downward pressure on the handle 5 and foot pressure on bar 7, the prongs 8 and 8a form deep water-receiving pockets 11 in the earth, the blades 9 form channels or tributaries connecting and communicating with the upper end portions of said pockets 11, and the blades 10 and 10a form additional channels or tributaries 13. The tributaries or channels 12 and 13 collect water when watering the lawn or when rain is falling, and conduct the collected water into the relatively deep pockets 11 which supply it to the subsoil and to the roots of the grass. On a more or less level ground, the tool is preferably so used that it slits the earth in crossing rows 14 and 14a, with the slits of each row communicating with each other and with the slits of each row communicating with the rows which cross them. This is shown at the right of Fig. 4. On a hillside or terrace, the slits are formed in horizontal rows with the slits of each row spaced from each other. The slits of each row, however, are staggered with respect to the slits of the next adjacent row and overlap same. Thus, any water which would ordinarily simply run down the hillside or terrace with very little soaking into the ground, will be collected by the incisions and supplied to the subsoil and to the grass roots.

In addition to merely forcing the tool down into the ground, it is preferable to rock it forwardly and rearwardly to some extent and perhaps sidewise also, thereby forming incisions of greater size than would otherwise be possible. Should it be desired, these incisions may be filled with limestone, or with any suitable substance which will prevent the incisions from closing and will not interfere materially with entrance of water. The material for filling the incisions is by preference of more or less absorbent nature to remain saturated with water for quite a period of time, gradually feeding it out to the subsoil and grass roots.

From the foregoing taken in connection with the accompanying drawing, it will be seen that novel and advantageous provision has been made for carrying out the objects of the invention, and while preferences have been illustrated, it is to be understood that variations may be made within the scope of the invention as claimed.

I claim:

1. A method of preparing a lawn for reception of water, comprising the steps of forming spaced relatively deep water-receiving holes in the earth of the lawn, and connecting the upper ends of said relatively deep holes by cutting relatively shallow water-collecting and conducting channels or tributaries in said earth of the lawn.

2. The method of preparing a lawn for reception of water, consisting in forming in the earth of the lawn a plurality of crossed rows each consisting of uniformly spaced relatively deep water-receiving holes connected at their upper ends by relatively shallow water-conducting slits or tributaries, and so positioning said relatively deep holes that some of them exist at the points where the rows cross each other and the rest of said holes exist between said crossing points.

3. The method of preparing an inclined portion of a lawn for reception of water, comprising the steps of forming substantially horizontal rows of elongated slits in said inclined lawn portion with the slits of any row spaced apart longitudinally and disposed at substantially right angles to the inclination of said lawn portion and staggered with respect to the slits of the next adjacent row and in overlapping relation with these latter slits, and forming relatively deep water-collecting holes in the ground in direct communication with said slits.

4. The method of preparing an inclined portion of a lawn for reception of water, comprising the steps of forming substantially horizontal rows of elongated slits in said inclined lawn portion with the slits of any row spaced apart longitudinally and disposed at substantially right angles to the inclination of said lawn portion, and staggered with respect to the slits of the next adjacent row and in overlapping relation with these slits, and forming relatively deep water-collecting holes in the ground at the ends of and between the ends of said slits, with each slit and the holes therein in direct communication with each other.

JOHN D. CAIN.